United States Patent Office 2,862,831
Patented Dec. 2, 1958

2,862,831
QUICK-BREAKING BITUMINOUS EMULSIONS HAVING INCREASED ADHESION TO MINERAL AGGREGATE

Edward W. Mertens, El Cerrito, Calif., assignor to California Research Corporation, San Francisco, Calif., a corporation of Delaware No Drawing. Application July 1, 1953
Serial No. 365,517

11 Claims. (Cl. 106—277)

The present invention relates to quick-breaking bituminous emulsions with water as the continuous phase and a water-insoluble, water-dispersible bituminous material such as asphalt for the dispersed phase. More particularly, the invention relates to quick-breaking emulsions containing an added material to promote adhesion of the bitumen to hydrophilic aggregate.

Quick-breaking aqueous emulsions of a bituminous substance are characterized by the property of quickly breaking down or separating and coalescing when diluted with water and/or mixed with electrolytes or contaminated with other foreign matter. Such emulsions are useful as adhesives, binding materials and in coating compositions, and find particular utility in road building. When a quick-breaking emulsion is sprayed or poured on aggregate or otherwise applied thereto, the emulsion breaks rapidly; the water is liberated; and the asphalt coats and binds the aggregate. More specifically defined, emulsions of this character are those oil-in-water type emulsions of bituminous materials having high enough residue (50%–70%) to be useful as road binders and the like, and undergoing not less than 60% breakdown on admixture with 35 mls. of 0.02 N calcium chloride in accordance with the procedure of ASTM D244-42 demulsibility test.

In the art of road building with quick-breaking asphalt emulsions, a problem of considerable and increasing importance is the phenomenon known as "stripping." When the emulsion is mixed with aggregate and breaks to liberate the water and the mixture allowed to dry with a coat of asphalt on the aggregate, it frequently happens that, upon subsequent exposure to moisture, the bituminous coating loses its adherence to, or "strips" from, the aggregate. This is especially true in the case of certain types of aggregates known as hydrophilic aggregates; for example, Massachusetts rhyolite, siliceous aggregates, certain types of limestone, etc.

Heretofore, the problem of stripping of asphaltic coatings from aggregate has been solved by the addition of small amounts of "antistripping" or "adhesion" agents to the bituminous binder. Many of these agents, however, are applicable to liquid bitumens, such as asphaltic cutbacks or to water-in-oil emulsions; that is, they can only be used when the bitumen is the continuous phase. The few adhesion agents heretofore proposed for use in asphalt-in-water type emulsions are electrolytes or similar materials which have an adverse effect on quick-breaking emulsions and, hence, can only be used in the more stable slow-setting bituminous emulsions. Such agents, although usually soluble in the aqueous phase of oil-in-water emulsions, cause quick-breaking emulsions to separate prematurely.

Thus, it is evident that the problem of improving the adhesion or antistripping properties of quick-breaking oil-in-water type bituminous emulsions is more difficult than that of improving the adhesion properties of bituminous binders in which the bitumen is present as the continuous phase or of bituminous emulsions of the slow-setting type which are relatively unaffected by electrolytes.

It is, therefore, an object of the present invention to provide a means of improving the adhesiveness to aggregates of quick-breaking, oil-in-water type emulsions of bituminous materials.

In accordance with this invention, the foregoing object is attained by forming a quick-breaking, oil-in-water type emulsion of bituminous material containing the combination of an alkali metal phosphonate or phosphate with a small amount of free alkali; in other words, the improved emulsions have incorporated therein oxyacids of phosphorus in combination with an amount of alkali in excess, up to a critical point, over that necessary to neutralize said oxy-acids. Thereby, the asphalt coatings of superior adhesion to hydrophilic aggregates result from emulsions which are still of the quick-breaking type. This result is unexpected and could not be predicted. Thus, while the free alkali is required for adequate emulsion characteristics with the present bituminous compositions, it has been proposed in the prior art, that in unemulsified asphalts the phosphonate material apparently must be used in the free acid form; for example, no appreciable antistripping properties are imparted to a liquid asphalt by a sodium phosphonate. Moreover, whereas by the addition of improper proportions of phosphorus salt and alkali the emulsions may be stabilized so much so that it no longer can be designated as quick-breaking, the desired high demulsibility can be achieved by adjusting the free alkali concentration in accordance with a preferred embodiment of the present invention.

In contrast to liquid, i. e., unemulsified, bitumen, it has been found that in quick-breaking, oil-in-water type bituminous emulsions, the phosphonate material must not only be neutralized with a monovalent alkali but an excess of alkali metal hydroxide must be present in order to obtain adequate emulsion characteristics. However, the amount of excess alkali must be below a critical maximum since above this amount the adhesion-improving action of phosphonates and phosphates are decreased substantially.

In accordance with the present invention, the amount of alkali metal hydroxide must be sufficient to neutralize the oxy-acid of phosphorus, and, additionally, must be sufficient to give a pH which is alkaline but below a critical maximum. While quick-breaking oil-in-water type emulsions generally have a pH of at least 12 and usually above 13, the quick-breaking emulsions of the present invention have an alkali content such that the pH is less than 12.2, preferably in the range 10–11.8. More generally, the minimum alkali concentration is that required for emulsification. Stated in terms of excess alkali over that necessary to neutralize the oxyacids of phosphorus and any relatively strong acids present, the amount of alkali should be sufficient to give such excess of from 0.01 to 0.06% and preferably from 0.03 to 0.05% by weight. In any case, when forming quick-breaking emulsions in accordance with the present invention, the amount of alkali above the minimum is less than that which brings about a reduction of the demulsibility below 55–60% as measured by the ASTM D244–42 demulsibility test. Usually, the total amount of alkali is less than about 0.15%, preferably less than 0.10% of NaOH, by weight of the asphalt emulsion. Suitable proportions of other alkalis, and suitable proportions of alkali based upon finished emulsions containing other amounts of asphalt, can be readily calculated.

The alkali metal phosphonate and phosphate salts employed in combination with the free alkali metal hydroxides in the quick-breaking emulsions of the present invention may be defined more generically as the alkali metal salts of organo-substituted oxy-acids of phosphorus containing at least 8 and up to about 40 carbon atoms, wherein the organo portion can be acyclic-aliphatic, cycloaliphatic (or other cyclic non-benzenoid radical), alkyl-aryl or aryl-alkyl radicals, of which the aliphatic radicals are preferred. In general, the alkali metal salts are derived from acids of trivalent and pentavalent phosphorus characterized by direct carbon-acid-forming element bonds, for example, a phosphonate or phosphinate; and acids having the carbon and acid-forming element linked to an intermediate atom such as oxygen, for example, a phosphate. The types of organo-substituted acids of phosphorus include phosphonous, phosphinous, phosphonic and phosphinic acid; the mono- and di-esters of phosphoric acid; and the mono-esters of phosphonous and phosphonic acids; etc.

Specific examples of the alkali metal salts of organo-substituted acids of phosphorus which may be employed in accordance with present invention are the alkali metal salts, e. g., sodium, potassium, or lithium salts of: n-octane phosphonic acid-1, 2-ethyl hexane phosphonic acid, n-octane phosphonic acid-2, n-nonane phosphonic acid, n-decane phosphonic acid, n-dodecane phosphonic acid, n-hexadecane phosphonic acid, n-octadecane phosphonic acid, n-eicosane phosphonic acid, phenyl ethane phosphonic acid, ethyl benzene phosphonic acid, phenyl dodecane phosponic acid, and ethyl cyclohexane phosphonic acid. Especially suitable phosphonic acids can be prepared from mixtures of aliphatic and cycloaliphatic hydrocarbon atoms such as petroleum distillates, kerosene, stove oil, diesel fuel oil, white oils, and paraffin waxes by bubbling oxygen through a mixture of the hydrocarbon and phosphorus trichloride, whereby a reaction mixture containing a phosphonyl chloride and phosphorus oxychloride is obtained. The phosphonyl chloride may be separated from the phosphorus oxychloride and thereafter converted to the phosphonic acid by hydrolysis. Diphosphonic acids, i. e., an alkane chain having two phosphonic acid groups attached thereto, can be produced by this method. Ordinarily, the crude reaction products contain 10–35% hydrocarbon phosphonic acid along with unreacted hydrocarbon.

Specific examples of other alkali metal salts are those derived from partially esterified phosphorus acids such as monohexyl, monoheptyl, monodecyl, monotetradecyl, monocetyl, monooctadecyl esters of phosphorous acid; dibutyl, dihexyl, didodecyl, dioctadecyl, and dicetyl phenyl diesters of phosphorous acid; diamyl, dihexyl, dicetyl, dodecyl phenyl and tetradecyl phenyl phosphinous and phosphinic acids; partially esterified phosphonous acids such as hexyl, dodecyl, and cetyl esters of phosphonous and phenyl phosphonous acids; partially esterified phosphonic acids such as hexyl, octyl, dodecyl, and octadecyl esters of ethyl and higher alkyl phosphonic acids, partially esterified ester acids of pentavalent phosphorus, such as hexyl, monohexyl phenyl, monododecyl, monocetyl, and monooctadecyl esters of phosphoric acids; diphosphonic acids such as mixtures of hydrocarbon diphosphonic acids, e. g., a mixture averaging tridecyl diphosphonic acid; crude or purified reaction products of phosphorus oxides with hydroxy fatty acids or glycerides thereof, the complex phosphated material being derived from hydroxy fatty acids such as 12-hydroxystearic acid, hydroxymyristic acid, hydroxypalmitic acid, hydroxybehenic acid, ricinoleic acid, etc., or from glycerides thereof, such as castor oil or hydrogenated castor oil; etc. In preparing the salt from phosphated castor oil sufficient alkali is employed to react with and neutralize the phosphoric acid groups and the free carboxylic groups, if any, resulting from hydrolytic splitting of the glycerides, thus giving a complex reaction product containing liberated glycerine, unreacted castor oil and salts of the various acids, etc.

Ordinarily, of the phosphonates those having organic chain lengths greater than about 12 carbon atoms, e. g., sodium octadecyl phosphonate or sodium wax phosphonate, are preferred, since these generally give greater adhesion. Also, particularly with the more sensitive high viscosity, high residue emulsions, higher viscosity emulsions are obtained with the organo phosphonates wherein the organo group has a molecular weight above 200 and especially above 235. As between the alkane monophosphonates and diphosphonates, the latter have less effect on the viscosity of the emulsion. However, where a low viscosity emulsion is desired, the shorter chain phosphonates are more effective. As between the phosphonates and phosphates, the latter are preferred since they cause less lowering of emulsion viscosities, and also because of the greater permanence, i. e., longer retention of adhesion-promoting effect upon storage. Of the phosphates, the complex reaction products derived from phosphated castor oil are preferred.

The alkali metal salts of organo-substituted acids of phosphorus are employed in amounts ranging from .02 to 3.5% and preferably from 0.05 to 1%, by weight of the emulsion. Above the preferred maximum of 1%, the resultant emulsions tend to become too stable. In general, for the best overall emulsion properties, the optimum combination, within the specific ranges, is that with the highest alkali content and lowest phosphorus salt concentration which imparts the desired adhesion. Thus, in the preferred embodiment of the invention, the amount of phosphorus salt is just that (i. e., minimum) which substantially improves the adhesion to the desired degree in the presence of the maximum amount of alkali. More particularly, the preferred emulsions contain effective amounts less than 1% of the phosphorus salt and sufficient alkali to give a pH in the particularly preferred range of 11.0–11.8.

The quick-breaking emulsions of the present invention can be prepared by methods well known in the art. For example, if asphalts are available which are emulsifiable in hot dilute aqueous caustic alkali solution without the aid of an added emulsified agent, they may be emulsified by the methods of Montgomerie U. S. Patent 1,643,675 and Braun U. S. Patent 1,737,491. While these Montgomerie type asphalts are most advantageously employed in the present invention, satisfactory emulsions can also be prepared from other types of asphalt by the use of a very small amount (e. g., 0.05 to 0.1% based on the weight of the emulsion) of saponifiable material such as oleic acid, Vinsol Resin, or rosin oil. Vinsol Resin is the trade name of a product of Hercules Powder Company, and is a solvent-extracted, petroleum-hydrocarbon-insoluble pinewood resin which is further identified in Buckley, U. S. Patent No. 2,256,886. Emulsions so produced are quick-breaking and can be used as such in conjunction with the above-mentioned combination of free alkali metal hydroxide and alkali metal salts of organo-substituted acids of phosphorus.

The bituminous materials emulsified in accordance with the present invention are normally solid, semi-solid, or viscous liquids at ordinary atmospheric temperatures. A classification of the suitable bituminous substances contemplated by the present invention appears in U. S. Patent No. 2,396,669. Examples of operative materials are bitumens, such as petroleum and native asphalts, native mineral waxes, asphaltites; pyrogenous distillates such as petroleum paraffin, oil-gas tar, coal tar; pyrogenous residues such as blown petroleum asphalts, sludge asphalts, pressure tars, residual oils, oil-gas tar pitch, etc. Of these materials, petroleum asphalt is most advantageously used, and it may be produced by steam refining, by air-blowing, by solvent extraction methods, or by a combination of such methods. If desired, the bitumens can be admixed with solvents, such as aromatic hydrocarbons, for the bitumen prior to emulsification. Emulsions of the other bituminous materials are susceptible to improvement by the procedure of the invention, and hence are within the broader scope of the present invention.

The emulsions, however prepared, will usually contain about 55% to 67%, by weight of asphalt or other dispersed material based upon the finished emulsion composition although the quantity of dispersed material can, under some circumstances, be either higher or lower. The ASTM D401-40 specification for quick-setting asphalt emulsions specifies a viscosity (Saybolt Furol at 77° F.) of not less than 20 nor more than 100 seconds, a residue of not less than 55 nor more than 60%, a demulsibility (35 mls. 0.02 N calcium chloride) of not less than 60% and a sieve test (20 mesh) of not more than 0.1%. Ordinarily, emulsions meeting these specifications will be used. However, since specifications are subject to change from time to time, and since requirements may vary from place to place, the properties of the quick-breaking emulsion can vary in one or more respects from those of the above-preferred set of specifications. Along with the asphalt, sufficient water is employed to form the desired emulsion; generally from 50 to 70 parts of asphalt are used with 30 to 50 parts of water.

The alkali used to obtain the alkaline water by emulsification of the Montgomerie type emulsions and to obtain the required free alkali concentration can be any of a group of water-soluble alkalis forming water-soluble salts such as sodium and potassium hydroxide, tri-sodium phosphate, etc. Preferably, the alkali is sodium or potassium hydroxide, and it is sometimes desirable that the free alkali be the same as that used to form the alkali metal salt of the organo-substituted acid of phosphorus in the particular emulsion being prepared.

As stated, the quick-breaking emulsion of the present invention has incorporated therein the above-defined amounts of a phosphonate or other phosphorus salt plus a free alkali, whereby superior adhesion of the asphalt to aggregate is obtained in a quick-breaking emulsion. Preferably the organo-substituted phosphorus salt is added, prior to emulsification, to the alkaline water containing sufficient alkali to give the required free alkali in the final emulsion. Thereafter, molten asphalt at about 230° to 280° F. is admixed with hot (130 to 180° F.) aqueous alkaline solution (containing added emulsifier, if any) in an open mix pot with a propeller-type agitator, whereupon emulsification quickly takes place. Alternatively, the procedure of Braun U. S. Patent 1,734,791 may be employed; that is, to a seed batch of previously formed emulsion are added simultaneously the molten asphalt and the hot aqueous alkali, and a portion of the emulsion thus produced is used as a seed batch for making a further quantity of emulsion. Or the molten asphalt and hot aqueous alkali may be fed simultaneously to a colloid mill in which the ingredients are subjected to the powerful shearing forces of two surfaces moving relatively to one another. A suitable mill for this purpose is the well-known Charlotte mill, as described more fully on page 556 of "Asphalts and Allied Substances," 5th edition, by Abraham. Also, the phosphorus salt may be added to the asphalt before emulsification although this is less desirable because a uniform dispersion in water is attained more readily than in asphalt.

While the above-described addition to quick-breaking, oil-in-water bituminous emulsions of organo-substituted phosphorus salts and free alkali in the critical range of concentrations increases the adhesion of the bitumen to hydrophilic aggregate, the action of these adhesion promoters can be further improved, and this is a special feature of the present invention, by neutralizing with an inorganic acid from 25% to 75% of the alkali which gives the alkaline pH. Alternatively, the inorganic salt itself as would result from such neutralization of the free alkali with the inorganic acid can be added in place of an equivalent amount of the free alkali. Under some circumstances, particularly with the lower amounts of alkali, additional amounts of inorganic salt over that used to replace the alkali are beneficial with respect to certain desired emulsion properties such as demulsibility and viscosity; generally, the total amount of inorganic salt including that which replaces the excess alkali should not exceed that amount which causes the emulsion to break prematurely; this maximum amount is usually about 0.2% by weight, although it may be higher in some instances as described hereinbelow. The inorganic salt is preferably incorporated into the alkaline water prior to emulsification although it can often be added as an aqueous phase of the pre-formed emulsion or as a separate aqueous stream flowing into the colloid mill.

The inorganic salt addition is believed to bring about an apparent enhancement of the adhesion-promoting action of the organo-substituted phosphorus salts by reducing the impairment of the adhesion-promoting action caused by the higher proportions of alkali metal hydroxides. Furthermore, this enhancement can be obtained without adversely affecting the desirable properties of the emulsion. Replacing too much of the alkali with inorganic salt can result either in very coarse emulsions, or, in extreme cases, in failure of the emulsion to form. Other than the enhancement of the adhesion, the differences in properties of an emulsion formulated with alkali alone and the alkali-salt combination are generally minor. Thus, in most cases, the demulsibility, the particle size of the dispersed phase, and the settlement properties are not appreciably changed by the inorganic salt replacing a part of the alkali, although an apparent, real benefit is the retention of the desirable properties of the relatively highly alkaline emulsions at a reduced alkalinity. However, in some instances, the inorganic salt addition brings about a beneficial change in the emulsion characteristics; for example, where emulsions of low viscosity are desired, the addition of salt will tend to reduce the viscosity as will the phosphonates, particularly the low molecular weight phosphonates.

Further, the inorganic salt addition not only enhances the action of the phosphorus salt in preventing stripping of asphalt films from aggregate in the presence of water but also substantially improves the adhesion of the asphalt to aggregate under conditions of boiling water as described in more detail hereinbelow.

Inorganic acids for neutralizing part of the free alkali, or for forming alkali metal salts to replace equivalent amounts of the free alkali or to supplement the free alkali, are preferably the acids having monovalent anions such as hydrochloric acid, hydrobromic acid, nitric acid, etc., although polyvalent-anion inorganic acids such as sulfuric acid, phosphoric acid, and chromic acid, can be employed also to advantage. Instead of the metal salts, other inorganic salts such as ammonium salts can sometimes be used.

Especially advantageous results are obtained when the phosphorus salts plus the critical excess of alkali are employed with sodium dichromate or like water-soluble salts of oxy-acids of chromium which are adhesion-promoters. The presence of small amounts of the phosphorus salts permits the incorporation of chromates into quick-breaking emulsions in adhesion-promoting amounts which normally are sufficient to break the emulsion or to impair considerably its storage stability. When using chromates in amounts of 0.05 to 0.5%, more desirably 0.05 to 0.25% by weight of the emulsion, the phosphorus salts are preferably employed in the lower concentrations, ranging from about 0.02 to 0.5%, especially from 0.04 to 0.2%.

As illustrative of the superior properties of the emulsions prepared in accordance with the present invention, quick-breaking emulsions were prepared employing a phosphorus salt adhesion promoter, free alkali with or without inorganic salts and the properties of the various resulting emulsions were noted. As indicated above, quick-breaking bituminous emulsions in order to fulfill their purpose efficiently should have certain properties such as good demulsibility, high adhesion to hydrophilic aggregate, and good storage characteristics. These properties are evaluated by certain tests which have been devised to serve as criteria for grading various emulsions.

Thus, the so-called "demulsibility" test described in ASTM D244-42 (demulsibility) is performed by mixing 100 grams of the emulsion with 35 ml. of 0.02 normal calcium chloride solution, and the percentage of asphalt broken out of the emulsion determined. Thereby, the ability of quick-breaking bituminous emulsions to break or separate on contact with the material to be coated can be evaluated. Most specifications for quick-breaking bituminous emulsions as described, for example, in ASTM D401-40 provide for about 60% emulsification in ASTM demulsibility tests D444-42 or higher.

One method of evaluating the adhesion of asphalt to aggregate is by the so-called "film stripping test." This test is a modification of the Nicholson Film Stripping Test and is carried out as follows: 50 grams of the indicated aggregate, all passing a 3/8" sieve and evenly graded from No. 8 sieve to 3/8" is mixed with the asphalt emulsion under investigation. The amount of asphalt employed is 12 grams which is added to the aggregate. The mixture is stirred thoroughly until all the aggregate is coated, and then is allowed to cure overnight in an oven held at 220° F. Thereafter the treated aggregate sample is placed in an eight-ounce screw-cap glass jar with 175 ml. of pure water and the jar agitated in a shaking machine at 45–50 revolutions per minute for fifteen minutes at a temperature of 120° F. At the end of this period the percentage of coated aggregate is visually estimated and noted.

Another adhesion test is the so-called "boiling test" which is carried out as follows: 100 grams of dry standard Massachusetts Rhyolite (obtained from the Central Scientific Company, Cambridge, Massachusetts), graded so as to pass entirely through a 1" sieve and to be retained completely on a No. 10 sieve were taken. This aggregate was heated to a temperature of 275°–325° F. and mixed with 12 grams of the test emulsion until complete coating resulted. Two 50-gram samples of the coated aggregate were then taken and each spread thinly on a metal can lid and placed in an oven for 24 hours at a constant temperature of 220° F. At the end of this curing period each 50-gram sample was dropped into 400 cc. of boiling distilled water in a 600 cc. beaker and stirred one minute at the rate of 60 times a minute, boiling meanwhile being continued. Each beaker was then removed from the heat and after ebullition ceased, cold water was run into the beaker through a submerged hose until any film of asphalt on the surface of the water was flushed out. Then each sample was removed and placed on absorbent paper and air-dried. The dried samples were then inspected visually by an experienced observer to estimate the percentage area coated, uncoated area being deemed that retaining no asphaltic coating. The figures for the two samples were then averaged.

A test employed in determining the homogeneity of the emulsions is the so-called "sieve test," described, for example in ASTM D244-42. According to this test a previously weighed No. 20 sieve having a 3-inch frame of the U. S. Standard Sieve Series is first wet with a 2% sodium oleate solution, after which there is poured therethrough exactly 1,000 grams of the emulsified asphalt. The container and residue on the sieve are washed thoroughly with the sodium oleate solution until the washings run clear. A previously weighed tin box cover or shallow metal pan of approximate size to fit over the bottom of the sieve is placed under the sieve and heated for two hours in a drying oven whose interior temperature is 200° F., then cooled in a desiccator and weighed. The total weight of the sieve pan and residue in grams less the combined tare weight of the sieve and the pan is the weight of the residue by the sieve test. The percentage of residue in the emulsion is calculated on the basis of this weight. Ordinarily a satisfactory emulsion will have a test value of not more than 0.01%.

A test for indicating the amount of asphalt deposited from an emulsion is the so-called "residue test," which is described in ASTM D244-42 (distillation), residue specifications usually calling for a residue between about 55 and 60%.

As illustrative of the practice of the present invention, the following specific examples are given:

*Example 1.*—A quick-breaking oil-in-water type emulsion of 200/300 penetration California asphalt refined from a San Joaquin Valley crude petroleum was prepared by the Montgomerie process, employing the following ingredients in the indicated proportions by weight percent: 57 parts asphalt, 43 parts water, 0.125 part sodium hydroxide and 0.25 part bentonite clay. Two other emulsions of the same ingredients in the same amounts were prepared but with 1 part of the indicated phosphonates added; the phosphonates were prepared by the hereinabove-described oxygen treatment of hydrocarbon-phosphorus trichloride mixtures from a heavy white oil (a refined paraffinic hydrocarbon of about 27 carbon atoms), and a refined kerosene (average carbon chain length of 13), respectively. The three resulting emulsions were subjected to the above-described "film stripping test" with the following results:

*Table I*

| Exp. No. | Phosphorus Salt | Adhesion | |
|---|---|---|---|
| | | Silica | Rhyolite |
| 1 | None | 5 | 30 |
| 2 | Sodium White Oil Phosphonate | 70 | 90 |
| 3 | Sodium Keryl Phosphonate | 60 | 80 |

*Example 2.*—A series of quick-breaking emulsions were prepared by the Montgomerie method from a 200/300 penetration California asphalt refined from a San Joaquin Valley crude. All the emulsions contained approximately 57 parts asphalt, 43 parts water, and 0.25 part bentonite clay. Sodium hydroxide and crude keryl phosphonic acid (20% active, the remainder being unreacted kerosene; the product being prepared by the hereinabove-described process of bubbling $O_2$ through a kerosene-$PCl_3$ mixture) were added in various amounts, as indicated below in parts by weight, to the water before emulsification. The values for sodium hydroxide in excess over that required to neutralize the phosphonic acids are given along with estimated pH values. Test results on the emulsions are also given on the following table:

and 1.0 part crude keryl phosphonic acid (20% active, the remainder being unreacted kerosene), the phosphonic Table II

| Test No | 1 | 2 | 3 | 4 | 5 | 6 | 7 | 8 | 9 | 10 |
|---|---|---|---|---|---|---|---|---|---|---|
| NaOH Added | 0.084 | | 0.094 | | 0.104 | | 0.125 | | 0.20 | 0.25 |
| Phosphonic Acid Added | 0 | 1.0 | 0 | 1.0 | 0 | 1.0 | 0 | 1.0 | 1.0 | 1.0 |
| Excess NaOH | ----- | 0.048 | ----- | 0.058 | ----- | 0.068 | ----- | 0.089 | 0.164 | 0.214 |
| pH | 11.7 | 11.5 | 11.9 | 11.7 | 12.0 | 11.8 | 12.2 | 11.9 | 12.4 | 12.5 |
| Film Stripping Test: | | | | | | | | | | |
| a. Limestone | 100 | 100 | 100 | 100 | 100 | 100 | 90 | 100 | 70 | 70 |
| b. Silica | 20 | 90 | 20 | 90 | 10 | 90 | 10 | 90 | 10 | 0 |
| c. Rhyolite | 20 | 100 | 10 | 90 | 10 | 100 | 10 | 90 | 10 | 0 |
| Boiling Test | 10 | 100 | 10 | 100 | ----- | 90 | 10 | 90 | 30 | 10 |
| Residue | 56 | 55 | 56 | 56 | 54 | 55 | 56 | 55 | 56 | 54 |
| Demulsibility | 67 | 93 | 53 | 77 | 57 | 45 | 67 | 30 | 30 | 75 |
| Viscosity at 77° F., S. S. F. | 36 | 34 | 31 | 32 | 34 | 34 | 36 | 34 | 32 | 31 |
| Sieve | 0.00 | 0.02 | 0.03 | 0.05 | 0.00 | 0.02 | 0.04 | 0.00 | 0.0 | 0 |

The foregoing data illustrate that when the alkali concentration becomes too high, the adhesion and demulsibility are reduced.

*Example 3.*—Another series of quick-breaking emulsions were prepared from a 180/200 penetration Venezuelan asphalt by the Montgomerie method. The phosphonates were prepared from the phosphonyl chlorides produced by the hereinabove-described method of bubbling $O_2$ through mixtures of $PCl_3$ and various hydrocarbons; the "refined wax" was a 125/130 melting point grade paraffin wax and the "soft wax" as a low melting non-straight chain paraffin wax. The phosphonic acids were mixed with the water plus sodium hydroxide, plus in some cases sodium chloride, before emulsification. The amounts, in parts by weight, of the various ingredients, in addition to 7.5 parts of bentonite clay used in each case, and the results of tests on the emulsion are given in the following table:

Table III

| Test No | 11 | 12 | 13 | 14 | 15 |
|---|---|---|---|---|---|
| Asphalt | 1,980 | 1,980 | 1,980 | 1,890 | 1,890 |
| Water | 1,020 | 1,020 | 1,020 | 1,110 | 1,110 |
| Sodium hydroxide | 2.82 | 2.82 | 2.82 | 2.4 | 2.4 |
| Sodium chloride | 0 | 0 | 0 | 1.8 | 2.1 |
| Phosphonic acid: | | | | | |
| n-dodecane | 6.0 | | | | |
| n-octadecane | | 3.0 | | | |
| n-octane | | | 3.0 | | |
| "refined wax" | | | | 6.0 | |
| "soft wax" | | | | | 4.5 |
| Boiling Test | 90 | 70 | 60 | 90 | 90 |
| Demulsibility | 38 | 85 | 71 | 55 | 96 |
| Viscosity at 122° F., S. S. F | 470 | 1,480 | 353 | 478 | 260 |

*Example 4.*—A quick-breaking emulsion was prepared of a 180/200 penetration California asphalt refined from a San Joaquin Valley crude employing the following ingredients in the indicated proportions: 1890 parts asphalts, 1.2 parts sodium hydroxide, 4.8 parts sodium chloride, 1110 parts water, 7.5 parts bentonite clay and 3.0 parts of a phosphonic acid of a "soft wax" as described in Example 3. The resulting emulsion had the following properties: 90% adhesion-boiling test, 94% demulsibility, and a viscosity of 28 Saybolt seconds Furol at 122° F.

*Example 5.*—Another quick-breaking emulsion was prepared in a similar manner from 1890 parts of a Venezuelan asphalt, 2.4 parts sodium hydroxide, 3.6 parts sodium dichromate, 1110 parts water, 7.5 parts bentonite clay, and 4.5 parts of the "soft wax" phosphonic acid used in Example 3. The resulting emulsion gave the following tests results: 90% adhesion-boiling test, 92% demulsibility, and a viscosity of 277 S. S. F. at 122° F.

*Example 6.*—To illustrate the retention of adhesion properties upon storage, a quick-breaking emulsion was prepared by the Montgomerie method from 56.0 parts of a 200/300 penetration California asphalt refined from a San Joaquin Valley crude, 43.0 parts distilled water, 0.094 part sodium hydroxide, 0.25 part bentonite clay, and 1.0 part crude keryl phosphonic acid (20% active, the remainder being unreacted kerosene), the phosphonic acid being admixed with the alkaline water prior to emulsification; the resulting emulsion was stored at room temperature and periodically samples were subjected to various tests with the following results:

Table IV

| Test | Number of Days after Preparation | | | |
|---|---|---|---|---|
| | 1 | 5 | 14 | 32 |
| Film Stripping (Percent): | | | | |
| a. Limestone | 100 | 100 | 90 | 100 |
| b. Silica | 90 | 90 | 80 | 90 |
| c. Rhyolite | 90 | 90 | 90 | 90 |
| Boiling (Percent) | 90 | 90 | 80 | 100 |
| Residue (Percent) | 56.0 | ----- | 55.2 | 55.8 |
| Demulsibility (Percent) | 63.5 | ----- | 6.6 | 76.8 |
| Viscosity at 77° F., Saybolt Sec. Furol | 37 | ----- | 36 | 32 |
| Sieve (Percent) | 0 | ----- | ----- | 0.05 |

*Example 7.*—Another series of quick-breaking emulsions similar to those in Example 1 were prepared except that various asphalts were employed and 1.5 parts of the previously mentioned crude phosphonic acids were used where indicated. The "film stripping tests" were as follows:

Table V

| Exp. No. | Crude Source of Asphalt | Additive | Adhesion | |
|---|---|---|---|---|
| | | | Silica | Rhyolite |
| 16 | San Joaquin Valley | None | 5 | 30 |
| 17 | Inglewood | do | 0 | 40 |
| 18 | San Joaquin Valley | Keryl Phosphonic | 90 | 80 |
| 19 | Inglewood | do | 90 | 90 |
| 20 | San Joaquin Valley | White Oil Phosphonic | 100 | 70 |
| 21 | Inglewood | do | 100 | 90 |

The above results illustrate that the phosphonates are effective to improve adhesion in various types of asphalts.

*Example 8.*—A quick-breaking emulsion was prepared by the Montgomerie process from 63.0 parts of a 189 penetration Venezuelan asphalt, 0.08 part sodium hydroxide, 37 parts water, 0.25 part bentonite clay and 0.15 part of the "soft wax" phosphonic acid described in Example 3. The resulting emulsion had the following properties: Film stripping—100% on silica and 95% on rhyolite, 70% boiling test adhesion, 63.6% residue test, 65.8% demulsibility and a viscosity of 732 Saybolt seconds Furol at 122° F.

*Example 9.*—Another quick-breaking emulsion was prepared from the same materials and proportions used in Example 8 together with 0.04 part of sodium dichromate. The properties of the emulsion were: Film stripping—100% on silica and 100% on rhyolite, 90% boiling test adhesion, 63.2% residue test, 66.5% demulsibility and a viscosity of 545 seconds Saybolt Furol at 122° F.

*Example 10.*—Another quick-breaking emulsion was prepared from the same materials and proportions used in Example 8 together with 0.16 part of sodium dichromate. The emulsion had the following properties: Film stripping—100% on each of silica and rhyolite, 85% boiling test adhesion, 64.8% residue test, 96.5% demulsibility and a viscosity of 216 seconds Saybolt Furol at 122° F.

*Example 11.*—A quick-breaking emulsion was prepared by the Montgomerie method from 57 parts of a 200/300 penetration Venezuelan asphalt, 0.094 part of sodium hydroxide, 43 parts of water, 0.25 part bentonite clay and 0.35 part of lauryl phosphoric acid. The resulting emulsion had the following properties: 80% adhesion-boiling test after 1 day and also after 5 days' storage, and a residue of 57.6%.

As will be appreciated by those skilled in the art, the quick-breaking oil-in-water type emulsion herein contemplated may be converted into slow-setting or mixing type emulsions by the treatment thereof with a stabilizing agent or protective colloid such as blood, glue, casein, starch, and various gums, for example, gum acacia, agar-agar, etc. or with additional quantities of soap-forming acids and proportionately-increased amounts of alkali.

Obviously many variations and modifications of the invention, as hereinbefore set forth, may be made without departing from the spirit and scope thereof, as defined in the following claims.

I claim:

1. A quick-breaking, oil-in-water type emulsion having improved bonding characteristics to hydrophilic aggregate, consisting essentially of bituminous material emulsified therein and in combination 0.02 to 3.5% by weight of an alkali metal salt of an organo-substituted oxyphosphorus acid having at least 8 carbon atoms and a water-soluble alkali in sufficient amount to give the aqueous phase of the emulsion an alkaline pH in the range 11.0–11.8, said amount being less than that which, together with the phosphorus salt, reduces the demulsibility below 55% as measured in the ASTM D244–42 (demulsibility) test.

2. The emulsion of claim 1 wherein the amount of phosphorus salt is 0.1% to 2% by weight of the emulsion.

3. The emulsion of claim 1 wherein the phosphorus salt is a phosphonate having at least 12 carbon atoms.

4. The emulsion of claim 1 wherein the phosphorus salt is a phosphate.

5. The emulsion of claim 1 wherein the phosphorous salt is a salt of a phosphated castor oil.

6. The emulsion of claim 1 wherein 25 to 75% of said free alkali metal hydroxide is substituted on an equivalent basis by a water-soluble inorganic salt.

7. The emulsion of claim 6 wherein said inorganic salt is an alkali metal salt of an inorganic acid having a monovalent anion.

8. The composition of claim 7 wherein said salt is sodium chloride.

9. A quick-breaking, oil-in-water type emulsion having improved bonding characteristics to hydrophilic aggregate, consisting essentially of water and bituminous material emulsified therein and in combination therewith from 0.02 to 0.5% of an alkali metal salt of an organo-substituted oxy-phosphorus acid having at least 8 carbon atoms and 0.05 to 0.25% of a water-soluble salt of an oxy-acid of chromium, said water containing a water-soluble alkali in sufficient amount to give the aqueous phase of the emulsion a pH in the range 11.0–11.8, said amount of alkali being less than that which, together with the phosphorus and chromium salts, reduces the demulsibility below 55% as measured in the ASTM D244–42 (demulsibility) test.

10. The emulsion of claim 9, wherein said phosphorus salt is an alkali metal salt of a phosphonic acid.

11. A quick-breaking, oil-in-water type emulsion characterized by improved adhesiveness to hydrophilic aggregate and consisting essentially of bituminous material emulsified therein and in combination therewith from 0.02 to 3.5% by weight of an alkali metal salt of an organo-substituted oxyphosphorus acid having at least 8 carbon atoms in its molecule and sufficient water-soluble alkali to provide in the aqueous phase of the emulsion an excess of free alkali from 0.01 to 0.06%, said excess being insufficient, together with the salt of oxyphosphorus acid, to reduce the demulsibility below 55% as measured by the ASTM D244–42 (demulsibility) test.

References Cited in the file of this patent

UNITED STATES PATENTS

| | | |
|---|---|---|
| 1,757,083 | Halvorsen | May 6, 1930 |
| 1,900,973 | Bertsch | Mar. 14, 1933 |
| 1,991,393 | Joyce | Feb. 19, 1935 |
| 2,247,722 | Chadder | July 1, 1941 |
| 2,393,573 | Sommer | Jan. 27, 1946 |
| 2,412,526 | McCoy | Dec. 10, 1946 |
| 2,412,545 | Watts | Dec. 10, 1946 |
| 2,481,323 | McCoy | May 23, 1949 |
| 2,508,431 | Smith et al. | May 23, 1950 |
| 2,592,564 | Hardman | Apr. 15, 1952 |
| 2,670,304 | McCoy | Feb. 23, 1954 |